(12) United States Patent
Gu

(10) Patent No.: US 8,705,003 B2
(45) Date of Patent: Apr. 22, 2014

(54) PHOTOSENSING DEVICE FOR DIGITAL STEREO SPLICED PICTURE PROJECTION IMAGING AND OPERATION METHOD THEREOF

(76) Inventor: Jinchang Gu, Shanghai (CN)

( * ) Notice: Subject to any disclaimer, the term of this patent is extended or adjusted under 35 U.S.C. 154(b) by 359 days.

(21) Appl. No.: 13/142,277

(22) PCT Filed: Dec. 16, 2009

(86) PCT No.: PCT/CN2009/075653
§ 371 (c)(1),
(2), (4) Date: Jun. 25, 2011

(87) PCT Pub. No.: WO2010/072124
PCT Pub. Date: Jul. 1, 2010

(65) Prior Publication Data
US 2011/0261337 A1 Oct. 27, 2011

(30) Foreign Application Priority Data
Dec. 26, 2008 (CN) .......................... 2008 1 0207935

(51) Int. Cl.
*G03B 27/42* (2006.01)
*G03B 27/54* (2006.01)
*G03B 27/32* (2006.01)
*G03B 27/04* (2006.01)
*G03B 27/58* (2006.01)

(52) U.S. Cl.
USPC ................... 355/53; 355/67; 355/72; 355/77; 355/95

(58) Field of Classification Search
USPC ........... 355/22, 30, 52, 53, 55, 67–71, 72–74, 355/77, 78, 83, 86, 91, 94, 95, 97; 700/120; 396/324, 335, 338, 340; 348/42; 430/311, 30, 321, 322
See application file for complete search history.

(56) References Cited

U.S. PATENT DOCUMENTS

| | | | | |
|---|---|---|---|---|
| 5,424,801 A | * | 6/1995 | Lo et al. .......................... | 355/22 |
| 5,657,111 A | * | 8/1997 | Lo .................................. | 355/22 |
| 5,691,805 A | * | 11/1997 | Lo et al. .......................... | 355/72 |
| 7,088,432 B2 | * | 8/2006 | Zhang ............................. | 355/77 |
| 2011/0001254 A1 | * | 1/2011 | Kruijt-Stegeman et al. . | 264/40.5 |

FOREIGN PATENT DOCUMENTS

CN          1131752 A  *  9/1996

OTHER PUBLICATIONS

English translation of CN1131752, published Sep. 25, 1996.*

* cited by examiner

*Primary Examiner* — Toan Ton
*Assistant Examiner* — Christina Riddle

(57) ABSTRACT

A photosensing device for digital stereo spliced picture projection imaging comprises a base (16), a front (43) and a back (25) wall plates located on the base (16), an light sensing platform (24) located slidably on the base (16), an exposure head (1) located above the front (43) and the back (25) wall plates, a longitudinal moving mechanism for moving the exposure head (1), a lateral moving mechanism for connecting the longitudinal moving mechanism with the front (43) and the back (25) wall plates, a pushing equipment located on the light sensing platform (24), a paper feeder located on a side of the light sensing platform (24), and a paper discharging mechanism located on the other side of the light sensing platform (24). The invention improves the resolution and the quality of the digital stereo image effectively. The device has an advantage of automatic process operation. After projection and photosensitization, the photosensitive material is conveyed automatically to the flushing device to be flushed and dried.

12 Claims, 5 Drawing Sheets

PHOTOSENSING DEVICE FOR DIGITAL STEREO SPLICED PICTURE PROJECTION IMAGING AND OPERATION METHOD THEREOF

BACKGROUND OF THE PRESENT INVENTION

1. Field of Invention

The present invention relates to a photosensing device for digital stereo spliced picture projection imaging and operation method thereof.

2. Description of Related Arts

The present method using the silver halide medium material to produce stereopictures in the market is still a conventional method of years ago. The method combines the grating and the photosensitive material before projection of the image on photosensing films, and then develops to obtain the stereopictures. However, the method has two drawbacks. The first drawback is that the photosensing films are used as carrier of images, and have almost been eliminated, and therefore have no supply inland and rely on import. The second drawback is that the photosensitive material must be combined with the grating before projection and sensitization and developing, the grating material is too thick to be folded for developing, and thus a large plane developing device, which is longer than 10 meters, is produced to develop correspondingly, which brings great inconvenience for developing, consumes a great deal of flushing lotion for forcing spraying and flushing upwardly, consumes lotion and time, takes a large space, pollutes the environment, and causes complicated operation, low success rate and bad effect. Additionally, since the grating and the photosensitive material combined beforehand has a double-faced film layer therebetween, the transparency of projection and sensitization is weakened to affect the contract and transmission effect of the stereopictures. Besides, the material is very expensive, and therefore the stereopictures market has high cost to be popularized and spread.

SUMMARY OF THE PRESENT INVENTION

Technical Problem

A technical problem to be solved by the present invention is to overcome the drawback in the prior art, and provide a photosensing device for digital stereo spliced picture projection imaging and operation method thereof.

Technical Proposal

In order to solve the technical problem, the present invention provides:

A photosensing device for digital stereo spliced picture projection imaging, which is characterized in, comprising:

a base, having two wall plates provided on a front and a back thereof respectively;

a light sensing platform, slidably connected with the base via a platform moving mechanism;

an exposure head, provided on the wall plates and above the light sensing platform, comprising a light source device, a LCD displayer under the light source device and connecting with a computer, and a lens under the LCD displayer;

a longitudinal moving mechanism for moving the exposure head, connected with the wall plates via a lateral moving mechanism;

a pushing equipment mounted on the light sensing platform for compressing a photosensitive material and a grating;

a paper feeder mounted on a first side of the light sensing platform for feeding paper to the light sensing platform; and a paper discharging mechanism mounted on a second side of the light sensing platform.

Preferably, a display surface of the LCD displayer is downwardly embedded into a fixing board horizontally mounted on a vertical baseplate; the light source device is mounted on a fixing board; a lens positioned under the LCD displayer is embedded into a lens fixing board mounted slidably and horizontally on the baseplate via a sliding device.

Preferably, the longitudinal moving mechanism comprises a beam connected with the exposure head and positioned on the wall plates, wherein a guide screw is mounted horizontally on the beam and has an end connected with an output end of an electromotor, a sliding block adapted to the guide screw is mounted on the exposure head.

Preferably, the lateral moving mechanism comprises a pair of extra guide screws symmetrically provided on the wall plates, the beam is slidably mounted on the wall plates via sliding blocks adapted to the pair of extra guide screws.

Preferably, at least a protuberance is mounted on a side of the lens fixing board opposite to the sliding block, a vertical rail adapted to the protuberance is provided on the sliding block.

Preferably, the pushing equipment comprises an absorption device comprising an exhaust device, wherein the light sensing platform is a chamber structure, a plurality of suction holes are provided on an upper surface of the light sensing platform, and at least one exhaust port is provided on a side of the light sensing platform and connected with the exhaust device.

Preferably, the pushing equipment comprises an upper compressing mechanism comprising at least two compressing elements mounted on two sides of the upper surface of the light sensing platform and each connected with the light sensing platform via at least a springing device.

Preferably, the pushing equipment further comprises an assistant upper compressing mechanism positioned under the exposure head and in center of the light sensing platform for compressing the grating and the photosensitive material from top to bottom.

Preferably, a paper cutter is provided on an exit of the paper feeder.

Preferably, the paper discharging mechanism comprises:

a first transmission mechanism positioned on a side of the light sensing platform for overturning the photosensitive material, comprising a plurality of first transmission rollers connected with a transmission belt, wherein an axial direction of the first transmission rollers is perpendicular to a transmission direction of the photosensitive material, the first transmission rollers are connected with an electromotor;

a second transmission mechanism adjacent to a first end of the first transmission mechanism and under the light sensing platform, comprising a plurality of second transmission rollers parallel to the first transmission rollers and connected with a transmission belt, and a third transmission mechanism adjacent to a second end of the first transmission mechanism, comprising a plurality of third transmission rollers parallel to the first transmission rollers and connected with a transmission belt.

Preferably, the platform moving mechanism comprises: a guide screw mounted longitudinally on the base having one end connected with an output end of an electromotor, and a sliding block adapted to the guide screw and mounted on a bottom of the light sensing platform.

The present invention further provides a digital stereo spliced picture projection imaging method for the photosensing device for digital stereo spliced picture projection imaging, which is characterized in, comprising the following steps:

S1: transmitting the photosensitive material to the light sensing platform;

S2: compressing the grating and the photosensitive material on the light sensing platform by the pushing equipment;

S3: processing projection to an area of the photosensitive material requiring photosensing by the exposure head;

S4: moving the exposure head to a next area of the photosensitive material requiring photosensing by the longitudinal moving mechanism and the lateral moving mechanism;

S5: repeating the steps S3 and S4 until all images of a same view finish projection to the photosensitive material;

S6: switching to images of a different view, repeating the steps S3 and S5 until images of all different views finish projection to the photosensitive material; and S7: releasing the pushing equipment, and actuating the paper discharging mechanism to output the photosensitive material automatically.

Preferably, the step S6 comprises the following steps of:

switching to a next image of different view taken by a camera by the computer, moving the lens from a previous position for a distance in a horizontal level, and moving the light sensing platform along a moving direction of the lens synchronously until an area requiring sensitization on the photosensitive material is covered by a light cast by the lens again.

Preferably, the moving direction of the lens is a rotating direction of the camera around a scene when taking a photo for a present projection process with respect to the camera when taking a photo for a previous projection process.

Preferably, in the step S7, the step of outputting the photosensitive material comprises the steps of: overturning the photosensitive material by the paper discharging mechanism.

Beneficial Effect

The positive beneficial effect of the present invention is as follows. The present invention increases the high pixel and high picture element of digital stereo imaging, is entirely operated automatically, conveniently and precisely, and the developing device develops and dries automatically after finishing projection and photosensing.

DETAILED DESCRIPTION OF THE PREFERRED EMBODIMENT

Figure 1:
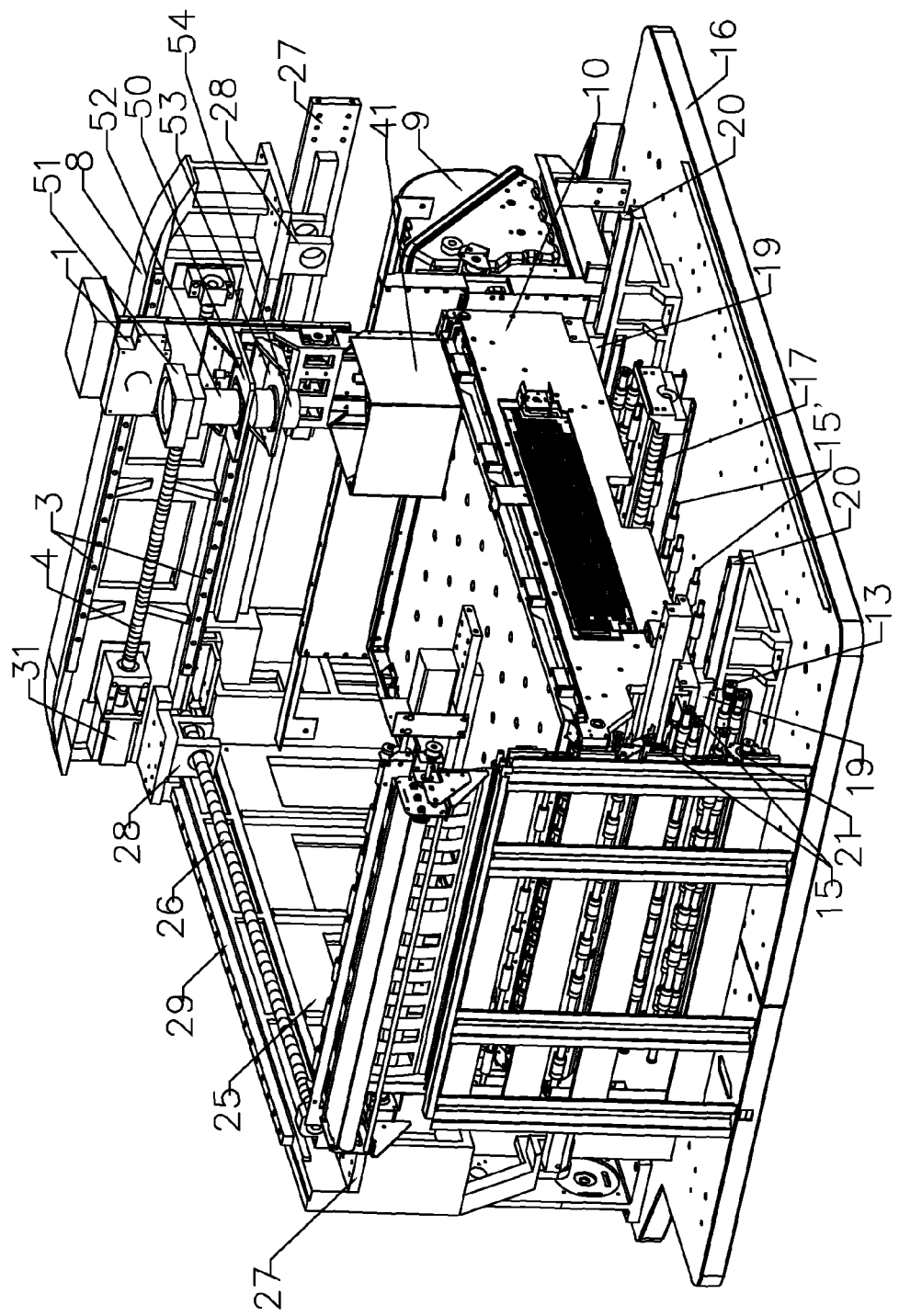
FIG. 1 is a perspective view of a photosensing device for digital stereo spliced picture projection imaging without a front wall plate according to a preferred embodiment of the present invention.
Figure 2:
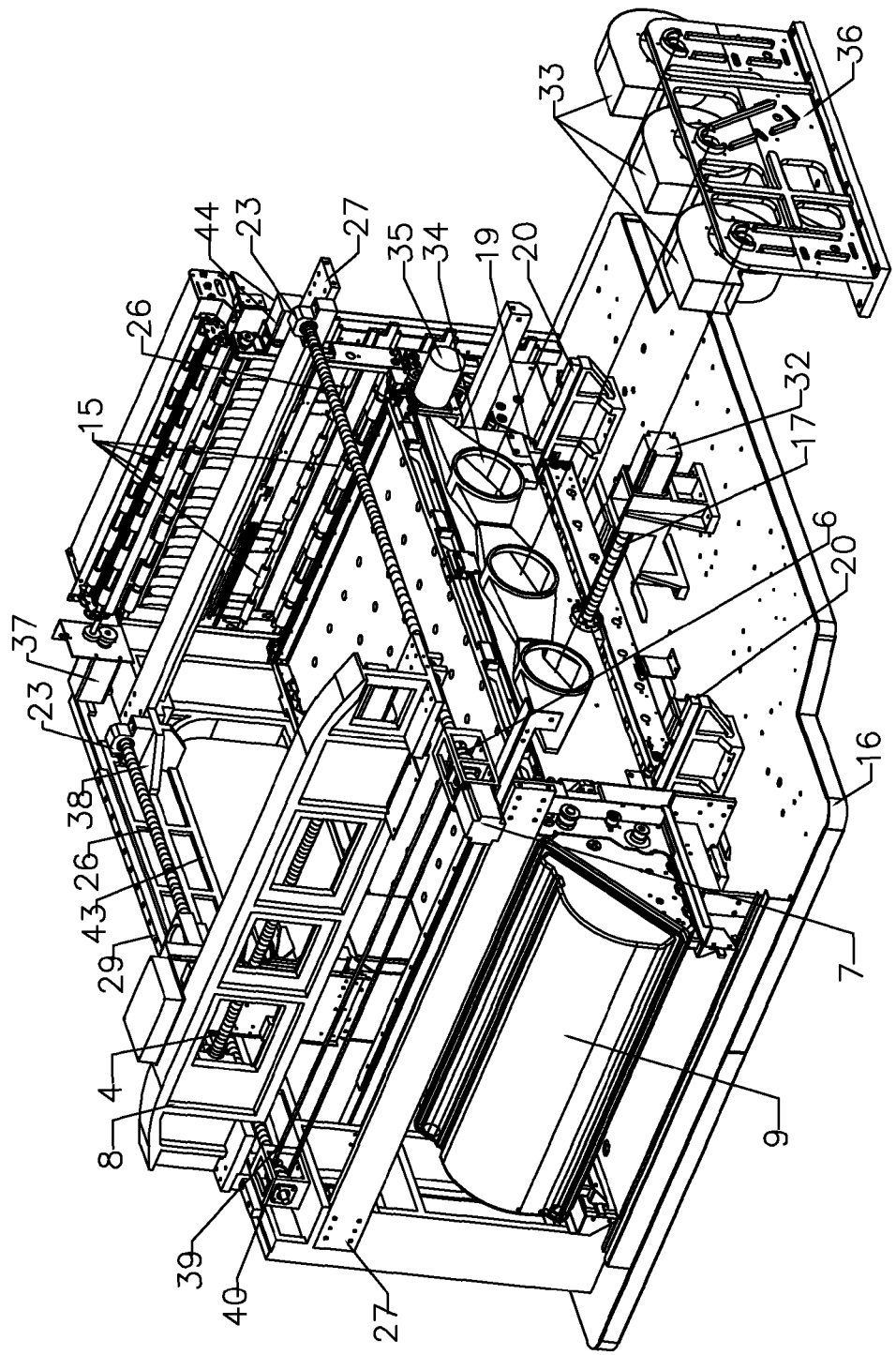
FIG. 2 is a perspective view of the photosensing device for digital stereo spliced picture projection imaging without a back wall plate according to the above preferred embodiment of the present invention.
Figure 3:
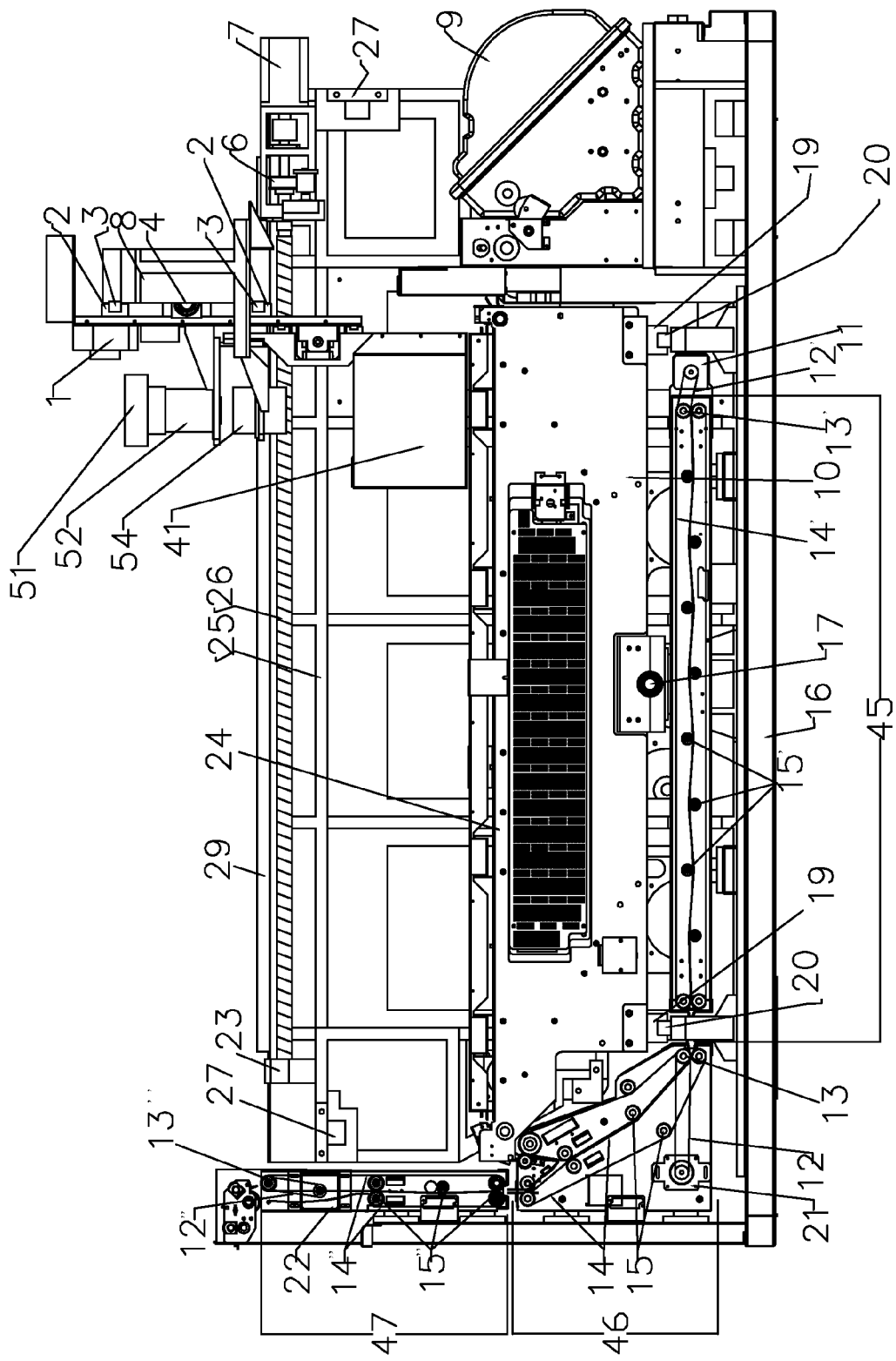
FIG. 3 is a front view of the photosensing device for digital stereo spliced picture projection imaging without the front wall plate according to the above preferred embodiment of the present invention.

A preferred embodiment of the present invention is described by accompanied with the drawing.

Referring to FIGS. 1-4 of the drawings, a photosensing device for digital stereo spliced picture projection imaging according to the present invention, comprises a base 16, a front wall plate 43 and a back wall plate 25 mounted on a front and a back of the base 16 respectively. A fixed light sensing platform 24 is mounted between the front wall plate 43 and the back wall plate 25 via two spacers 27. The light sensing platform 24 is slidably mounted on the base 16 via a platform moving mechanism. The platform moving mechanism in the present preferred embodiment comprises a sliding block fixedly mounted on a bottom of the light sensing platform 24. The sliding block is adapted to a guide screw 17 on the base 16. The guide screw 17 is connected to an output end of an electromotor 32. A rail 20 is provided on the 16 and two sides of the guide screw 17. A sliding block 19 adapted to the rail 20 is provided on a corresponding position of the bottom of the light sensing platform 24, in such a manner that the light sensing platform 24 is capable of moving longitudinally with respect to the base 16. A paper feeder and a paper discharging mechanism are provided on two ends of the light sensing platform 24 transversely. The paper feeder comprises a box 9. A paper cutter is provided on an exit of the box 9. An exposure head 1 is suspended above the front wall plate 43 and the back wall plate 25 and above the light sensing platform 24 via a beam 8.

The exposure head 1 comprises a vertical baseplate, a LCD displayer 52 for display an image source, wherein a display surface of the LCD displayer 52 is downwardly embedded into a fixing board 50 horizontally mounted on the baseplate; a light source device 51 mounted on the fixing board 50 and above the LCD displayer 52; and a lens 54 positioned under the LCD displayer 52, wherein the lens 54 is embedded into a lens fixing board 53 mounted slidably and horizontally on the baseplate via a sliding device which can be guide screw moving unit or chain transmission.

A longitudinal moving mechanism is provided on the beam 8, comprises a guide screw 4 mounted on the beam 8 and controlled by an electromotor 31. A sliding block adapted to the guide screw 4 is mounted on the baseplate of the exposure head 1. Rails 3 are provided on two sides of the guide screw 4. With the moving unit, the exposure head 1 moves on the beam 8 longitudinally with respect to the light sensing platform 24.

Meanwhile, the beam 8 is mounted on the front wall plate 43 and the back wall plate 25 via a lateral moving mechanism. The lateral moving mechanism comprises two rails 29 provided on the front wall plate 43 and the back wall plate 25 respectively for inserting two ends of the beam 8. A supporting board 38 for mounting a guide screw base 23 is provided on each of the front wall plate 43 and the back wall plate 25. A guide screw 26 is mounted on each of the two opposite guide screw bases 23. A driving wheel 6 and a driven wheel 40 are provided on one end of the two guide screws 26 respectively, and are connected by a transmission belt 39. The driving wheel 6 is connected with an output end of an electromotor 7 mounted on the back wall plate 25. A sliding block 28 is mounted on each of the two guide screws 26 which are connected with the driving wheel 6 and the driven wheel 40. The sliding blocks 28 are fixedly connected with two ends of the beam 8, in such a manner that the electromotor 7 drives the beam 8 to move the exposure head 1 along the light sensing platform 24 laterally.

An absorption device comprises the light sensing platform 24 of chamber structure, wherein a plurality of suction holes are provided on an upper surface thereof for supporting a photosensitive material and a grating, three exhaust ports 34 for connecting with an exhaust device 33 via a pipe 42 are provided on a side of the light sensing platform 24. The exhaust device 33 is mounted on the base 16 via a frame 36. Preferably, the pipe can be of flexibility. When using, the photosensitive material is covered on the light sensing platform 24 with a sensitive layer thereof upwards, the exhaust device 33 exhausts air inside the light sensing platform 24 via the exhaust ports 34 to form negative pressure, and the photosensitive material attaches to the upper surface firmly under external atmospheric pressure on an upper side thereof, so as to prevent the photosensitive material from moving during exposure.

An upper compressing mechanism is provided above the light sensing platform 24 for compressing the grating and the photosensitive material, which comprises two compressing bars. At least one springing device is mounted on each of the compressing bars, and has a first end mounted on the light sensing platform 24 and a second end passing through the compressing bar perpendicularly and mounting on an upper surface of the compressing bar. With the springing device, the compressing bars move up and down with respect to the light sensing platform 24.

A light shading canister 41 is provided above the light sensing platform 24. An assistant upper compressing mechanism is provided on a bottom of the light shading canister 41 and under an exposure head 1. The light shading canister 41 has a size of a transverse section equal to a size of an image of each projection and photosensing. A frame structure is provided under the light shading canister 41. According to the preferred embodiment, a plurality of pneumatic pens are perpendicularly mounted on the frame structure as the assistant upper compressing mechanism.

Preferably, the paper discharging mechanism comprises:

a first transmission mechanism 46 positioned on a lower left corner of the light sensing platform 24 for overturning the photosensitive material, comprising a plurality of first transmission rollers 15 connected with a transmission belt 14, wherein the first transmission rollers 15 are arranged longitudinally along the light sensing platform 24, comprise a main first transmission roller 13 connected with an output end of an electromotor 21 via a transmission belt 12;

a second transmission mechanism 45 adjacent to a first end of the first transmission mechanism 46 and under the light sensing platform 24, comprising a plurality of second transmission rollers 15' parallel to the first transmission rollers 15 and connected with a transmission belt 14', wherein a main second transmission rollers 13' is connected with an output end of an electromotor 11 via a transmission belt 12; and a third transmission mechanism 47 adjacent to a second end of the first transmission mechanism 46, comprising a plurality of third transmission rollers 15" parallel to the first transmission rollers 15 and connected with a transmission belt 14", wherein a main third transmission rollers 13" is connected with an output end of an electromotor 22 via a transmission belt 12".

Preferably, the transmission belts 14 and 14' can be rotated forwardly and backwardly by controlling the electromotors 21 and 12.

Preferably, the platform moving mechanism, the longitudinal moving mechanism, the lateral moving mechanism, the paper feeder and the paper discharging mechanism can be controlled by a computer.

The principle of digital stereo projection according to the present invention is described as below, taking example of single area requiring projection and photosensing.

Firstly, to describe more clearly, three photos to be used is described herein. A first photo is taken by a camera in front of an object, a second photo is taken by the camera after turning left around the object for 5 degrees from the front thereof, and a third photo is taken by the camera after turning right around the object for 5 degrees from the front thereof.

Secondly, the left or right direction is based on the front of the object.

S1: displaying the first photo with the LCD displayer, wherein the lens is right under the LCD displayer, when three-colored light cast by the light source device reaches to the lens via the LCD displayer after being mixed by a light mixing canister, the first photo on the LCD displayer is processed for projection and sensitization on the photosensitive material through the lens and the grating, to finish a first projection and sensitization;

S2: switching to the second photo by the computer, keeping the light source device still, the electromotor drives the lens to move leftwardly and horizontally for a certain distance, wherein the light sensing platform 24 synchronously moves along a direction the lens moves, until a light cast through the lens covers the whole area of the photosensitive material again;

S3: processing a second projection and sensitization to the photosensitive material, which is same to the step S1;

S4: switching to the third photo by the computer, the electromotor drives the lens to move rightwardly and horizontally for a certain distance, wherein the light sensing platform 24 synchronously moves along a direction the lens moves, until a light cast through the lens covers the whole area of the photosensitive material again;

S5: processing a third projection and sensitization to the photosensitive material, which is same to the step S1; and S6: developing the photosensitive material.

The method for digital stereo spliced picture projection imaging is described as below.

Firstly, a grating material of corresponding size is placed on the light sensing platform 24, the paper feeder transmits the photosensitive material inside the box 9 to be between the light sensing platform 24 and the grating material after passing the paper cutter, the photosensitive material attaches on the sensing platform 24 by the pushing equipment, and the grating material is compressed on the photosensitive material by the upper compressing mechanism.

Figure 4:
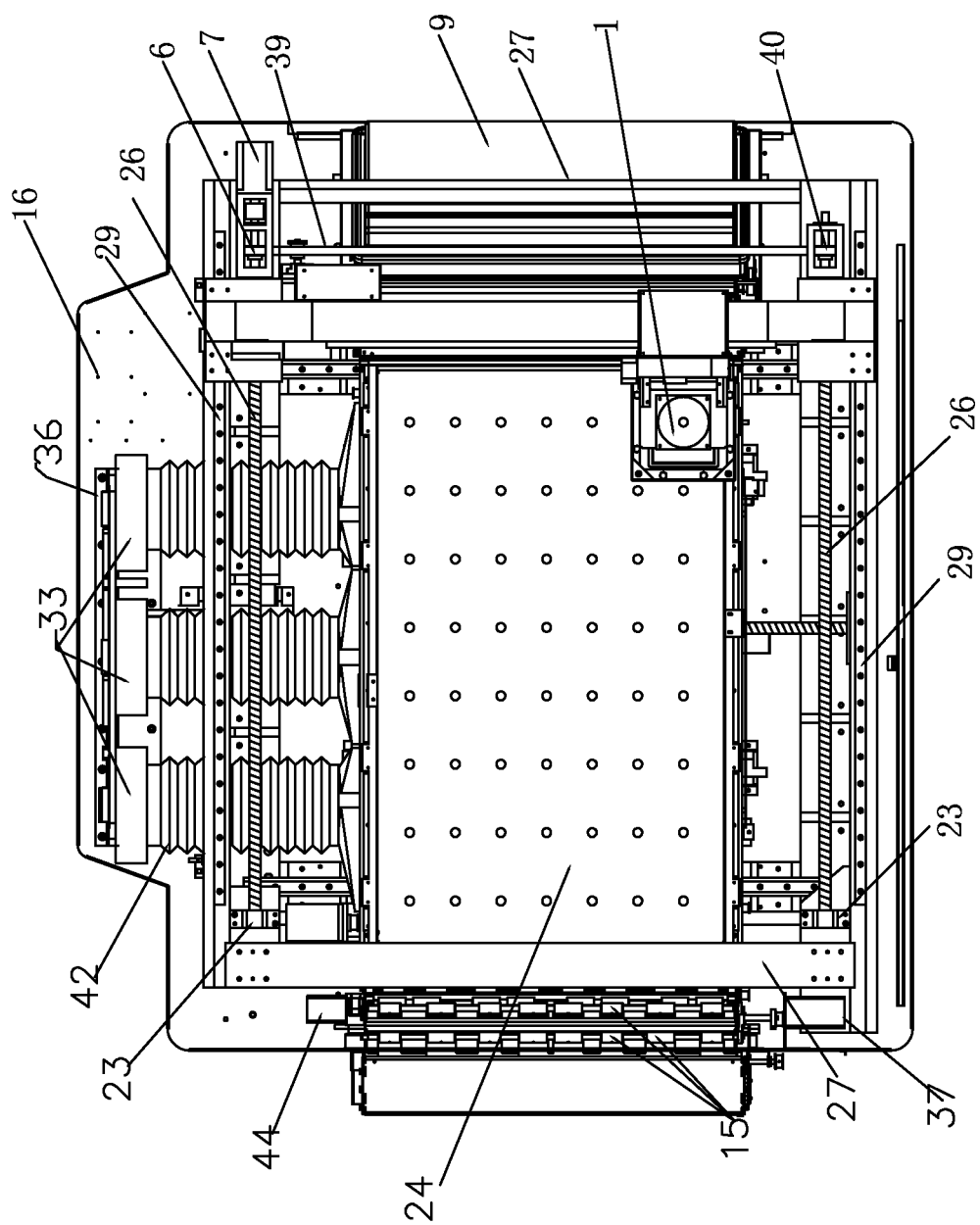
FIG. 4 is a top view of the photosensing device for digital stereo spliced picture projection imaging according to the above preferred embodiment of the present invention.
Figure 5:
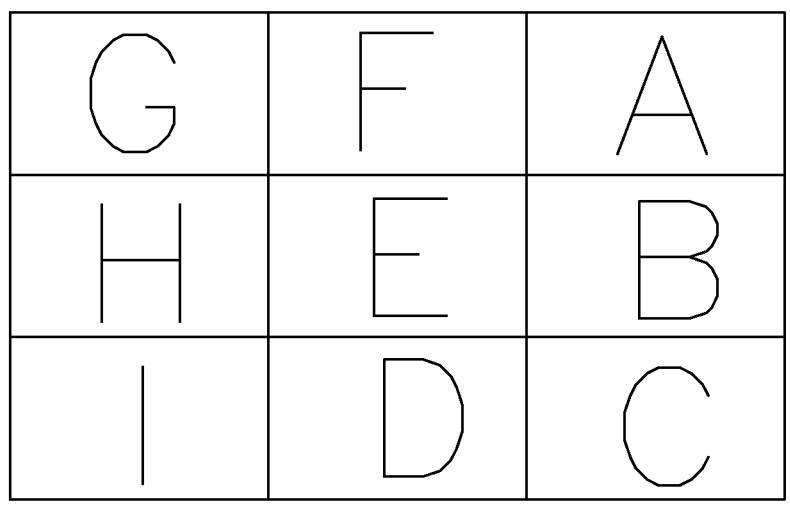
FIG. 5 is a schematic view of a light sensing platform divided into nine areas requiring photosensing based on the FIG. 4.

Secondly, referring to FIGS. 1, 4 and 5, the light sensing platform 24 is divided into nine areas requiring photosensing of A-I. The electromotor 31 drives the guide screw 4 to rotate, so as to move the exposure head 1 to be above the A area of the photosensitive material. The image in the LCD displayer of the exposure head 1 is switched after photosensing, meanwhile, the electromotor 31 drives the guide screw 4 to rotate, so as to move the exposure head 1 (direction Y) to be above the B area of the photosensitive material, and process projection and photosensing again. In the same way, the exposure head 1 is moved to be above the C area of the photosensitive material. When needing moving the exposure head 1 to be above the D area of the photosensitive material from the C area, the electromotor 7 drives the driving wheel 7 and the driven wheel 40 to rotate, so as to rotate the two guide screws 26. The sliding blocks 28 on the guide screws 26 are moved by the guide screws 26, the beam 8 moves parallelly (direction X), so that the exposure head 1 (direction Y) mounted on the beam 8 moves (direction X) to be above the D area of the photosensitive material. And the like, the exposure head 1 moves (direction Y) to be above the E or F area of the photosensitive material, so as to process projection and photosensing to all areas of the photosensitive material to accomplish a complete projection and photosensing procedure of an image of a stereo photo.

Thirdly, by adjusting an angle of the lens inside the exposure head 1 with respect to the LCD displayer, and moving the light sensing platform synchronously, the photos of different views to be projected on a same area can cover the area to process a second projection and photosensing. The process of the second projection and photosensing is the same as the first projection and photosensing, and the like. The rounds of projection and photosensing is equal to the number of images of different views taken by the stereo camera (each round of projection and photosensing covers all the A-I areas). For example, when a five-dimensional photo have five images, and we divide projection and photosensing of each image into nine times, we need to process projection and photosensing for 45 times, move the angle of the lens inside the exposure head with respect to the LCD displayer for five time and the light sensing platform 24 along the same direction for five times, and process projection and photosensing for five rounds.

After finishing projection and photosensing, the pushing equipment is released to eject the grating material, the electromotor 35 transmits the photosensitive material after photosensing to the first transmission mechanism 46, which rotates the transmission belt 12 by the electromotor 21, so as to rotate the main first transmission roller 13, the transmission belt 14 and the first transmission roller 15 of the first transmission mechanism 46, in such a manner that the photosensitive material is transmitted to the second transmission mechanism 45, the electromotor 11 rotates the transmission belt 12', so as to rotate the main second transmission roller 13', the transmission belt 14' and the second transmission roller 15' of the second transmission mechanism 45. When the photosensitive material is completely transmitted to the second transmission mechanism 45, by exchanging the rotating direction of the electromotors 12 and 21, the photosensitive material is transmitted to the first transmission mechanism 46 again, and according to the characters of the photosensitive material, the photosensitive material is transmitted to the third transmission mechanism 47, the electromotor 22 rotates the transmission belt 12", so as to rotate the main third transmission roller 13", the transmission belt 14" and the third transmission roller 15" of the third transmission mechanism 47, so that the photosensitive material is transmitted to a developing device, finishing the transmission process.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A photosensing device for digital stereo spliced picture projection imaging, comprising:
   a base, having two wall plates provided on a front and a back thereof respectively;
   a light sensing platform, slidably connected with said base via a platform moving mechanism;
   an exposure head, provided on said wall plates and above said light sensing platform, comprising a light source device, a LCD displayer under said light source device, and a lens under said LCD displayer;
   a longitudinal moving mechanism for moving said exposure head, connected with said wall plates via a lateral moving mechanism;
   a pushing equipment mounted on said light sensing platform;
   a paper feeder mounted on a first side of said light sensing platform for feeding paper to said light sensing platform; and
   a paper discharging mechanism mounted on a second side of said light sensing platform.

2. The photosensing device for digital stereo spliced picture projection imaging, as recited in claim 1, wherein a display surface of said LCD displayer is downwardly embedded into a fixing board horizontally mounted on a vertical baseplate; said light source device is mounted on a light source fixing board; a lens positioned under said LCD displayer is embedded into a lens fixing board mounted slidably and horizontally on said baseplate via a sliding device.

3. The photosensing device for digital stereo spliced picture projection imaging, as recited in claim 1, wherein said longitudinal moving mechanism comprises a beam connected with said exposure head and positioned on said wall plates, wherein a guide screw is mounted horizontally on said beam and has an end connected with an output end of an electromotor, a sliding block adapted to said guide screw is mounted on said exposure head.

4. The photosensing device for digital stereo spliced picture projection imaging, as recited in claim 3, wherein said lateral moving mechanism comprises a pair of extra guide screws symmetrically provided on said wall plates, said beam is slidably mounted on said wall plates via sliding blocks adapted to said pair of extra guide screws.

5. The photosensing device for digital stereo spliced picture projection imaging, as recited in claim 1, wherein said pushing equipment comprises an absorption device comprising an exhaust device, wherein said light sensing platform is a chamber structure, a plurality of suction holes are provided on an upper surface of said light sensing platform, and at least one exhaust port is provided on a side of said light sensing platform and connected with said exhaust device.

6. The photosensing device for digital stereo spliced picture projection imaging, as recited in claim 5, wherein said pushing equipment further comprises an assistant upper compressing mechanism positioned under said exposure head and in center of said light sensing platform.

7. The photosensing device for digital stereo spliced picture projection imaging, as recited in claim 1, wherein said paper discharging mechanism comprises:
   a first transmission mechanism positioned on a side of said light sensing platform, comprising a plurality of first transmission rollers connected with a transmission belt, said first transmission rollers are connected with an electromotor;
   a second transmission mechanism adjacent to a first end of said first transmission mechanism and under said light sensing platform, comprising a plurality of second transmission rollers parallel to said first transmission rollers and connected with a transmission belt, and
   a third transmission mechanism adjacent to a second end of said first transmission mechanism, comprising a plurality of third transmission rollers parallel to said first transmission rollers and connected with a transmission belt.

8. The photosensing device for digital stereo spliced picture projection imaging, as recited in claim 1, wherein said platform moving mechanism comprises: a guide screw mounted longitudinally on said base having one end connected with an output end of an electromotor, and a sliding block adapted to said guide screw and mounted on a bottom of said light sensing platform.

9. A digital stereo spliced picture projection imaging method for the photosensing device for digital stereo spliced picture projection imaging, as recited in claim 1, comprising the following steps:
- S1: transmitting a photosensitive material to the light sensing platform;
- S2: compressing a grating and the photosensitive material on the light sensing platform by the pushing equipment;
- S3: processing projection to an area of the photosensitive material requiring photosensing by the exposure head;
- S4: moving the exposure head to a next area of the photosensitive material requiring photosensing by the longitudinal moving mechanism and the lateral moving mechanism;
- S5: repeating the steps S3 and S4 until all images of a same view finish projection to the photosensitive material;
- S6: switching to images of a different view, repeating the steps S3 and S5 until images of all different views finish projection to the photosensitive material; and
- S7: releasing the pushing equipment, and actuating the paper discharging mechanism to output the photosensitive material automatically.

10. The digital stereo spliced picture projection imaging method, as recited in claim 9, wherein the step S6 comprises the following steps of:
switching to a next image of different view taken by a camera, moving the lens from a previous position for a distance in a horizontal level, and moving the light sensing platform along a moving direction of the lens synchronously until an area requiring sensitization on the photosensitive material is covered by a light cast by the lens again.

11. The digital stereo spliced picture projection imaging method, as recited in claim 10, wherein the moving direction of the lens is a rotating direction of the camera around a scene when taking a photo for a present projection process with respect to the camera when taking a photo for a previous projection process.

12. The digital stereo spliced picture projection imaging method, as recited in claim 9, wherein in the step S7, the step of outputting the photosensitive material comprises the steps of: overturning the photosensitive material by the paper discharging mechanism.

\* \* \* \* \*